US012556153B2

(12) United States Patent
Nordmann

(10) Patent No.: US 12,556,153 B2
(45) Date of Patent: Feb. 17, 2026

(54) SWITCHABLE-REACTOR UNIT, VARIABLE REACTOR, HIGH-FREQUENCY GENERATOR, AND IMPEDANCE ADJUSTMENT ASSEMBLY HAVING A SWITCHABLE-REACTOR UNIT

(71) Applicant: TRUMPF Huettinger GmbH + Co. KG, Freiburg (DE)

(72) Inventor: Birger Nordmann, Alfter (DE)

(73) Assignee: TRUMPF Huettinger GmbH + Co. KG, Freiburg (DE)

( * ) Notice: Subject to any disclaimer, the term of this patent is extended or adjusted under 35 U.S.C. 154(b) by 447 days.

(21) Appl. No.: 18/066,289

(22) Filed: Dec. 15, 2022

(65) Prior Publication Data

US 2023/0216467 A1   Jul. 6, 2023

Related U.S. Application Data

(63) Continuation of application No. PCT/EP2021/066633, filed on Jun. 18, 2021.

(30) Foreign Application Priority Data

Jun. 19, 2020 (DE) .................... 20 2020 103 539.8

(51) Int. Cl.
*H03H 7/01* (2006.01)
*H03H 7/38* (2006.01)
*H03H 19/00* (2006.01)

(52) U.S. Cl.
CPC ........ *H03H 7/1775* (2013.01); *H03H 7/0115* (2013.01); *H03H 7/383* (2013.01); *H03H 19/004* (2013.01)

(58) Field of Classification Search
CPC ..... H03H 7/383; H03H 7/1775; H03H 19/004
(Continued)

(56) References Cited

U.S. PATENT DOCUMENTS 5,473,291 A   12/1995   Brounley
5,654,679 A    8/1997   Mavretic et al.
(Continued)

FOREIGN PATENT DOCUMENTS

CN    202978850 U    6/2013
DE    102009001355 A1    9/2010
(Continued)

OTHER PUBLICATIONS

Johannes Heberle et al, "Electro-optic and acousto-optic laser beam scanners," Proceedings of SPIE, Laser-based Micro- and Nanoprocessing X, Mar. 2016, pp. 1-12, vol. 9736, Society of Photo-Optical Instrumentation Engineers, Bellingham, Washington USA.

*Primary Examiner* — Rakesh B Patel
(74) *Attorney, Agent, or Firm* — Leydig, Voit & Mayer, Ltd.

(57) ABSTRACT

A switchable reactance unit includes an RF terminal configured to connect to a transmission line for transmitting a signal at a frequency in a range of 1-200 MHz, and a switching arrangement comprising a plurality of switching elements used in parallel. Each switching element has a control terminal, and is connected to the RF terminal via at least one individual reactance assigned to the switching element and connected in series with the switching element. The switching elements are controllable or controlled via their control terminals in such a way that they switch simultaneously.

21 Claims, 2 Drawing Sheets

(58) Field of Classification Search
USPC .................................... 333/101, 175, 258
See application file for complete search history.

(56) References Cited

U.S. PATENT DOCUMENTS

| | | | |
|---|---|---|---|
| 6,424,232 B1 | 7/2002 | Mavretic et al. | |
| 6,677,828 B1 | 1/2004 | Harnett et al. | |
| 7,153,387 B1 | 12/2006 | Tomoyasu | |
| 7,180,758 B2 | 2/2007 | Lincoln et al. | |
| 7,251,121 B2 | 7/2007 | Bhutta | |
| 7,498,908 B2 | 3/2009 | Gurov | |
| 7,605,673 B2 | 10/2009 | Robotham, Jr. et al. | |
| 7,633,357 B2 * | 12/2009 | Hangai | H01P 1/15 333/262 |
| 8,416,008 B2 | 4/2013 | Van Zyl et al. | |
| 8,436,643 B2 | 5/2013 | Mason | |
| 9,306,533 B1 | 4/2016 | Mavretic | |
| 9,490,353 B2 | 11/2016 | Van Zyl et al. | |
| 9,525,412 B2 | 12/2016 | Mavretic | |
| 9,660,613 B2 | 5/2017 | Van Zyl et al. | |
| 9,715,996 B2 | 7/2017 | Son | |
| 10,229,816 B2 | 3/2019 | Coumou et al. | |
| 10,269,540 B1 | 4/2019 | Carter et al. | |
| 10,770,770 B2 * | 9/2020 | Sharma | H03H 7/185 |
| 10,818,477 B2 | 10/2020 | Maier et al. | |
| 2008/0061901 A1 | 3/2008 | Gilmore | |
| 2010/0134867 A1 | 6/2010 | Gugel et al. | |
| 2010/0225411 A1 | 9/2010 | Maier | |
| 2014/0204454 A1 | 7/2014 | Li et al. | |
| 2017/0194688 A1 * | 7/2017 | Sharma | H01P 1/18 |
| 2018/0041183 A1 | 2/2018 | Mavretic et al. | |
| 2019/0214232 A1 | 7/2019 | Morii et al. | |

FOREIGN PATENT DOCUMENTS

| | | |
|---|---|---|
| DE | 102011007598 A1 | 10/2012 |
| DE | 102015220847 A1 | 4/2017 |
| DE | 202017105350 U1 | 11/2018 |
| DE | 202020102084 U1 | 5/2020 |
| EP | 2795392 A1 | 10/2014 |
| EP | 2149070 B1 | 4/2018 |
| EP | 3628488 A1 | 4/2020 |
| JP | 2017069823 A | 4/2017 |
| KR | 20130058838 A | 6/2013 |
| RU | 2569279 C2 | 11/2015 |
| WO | WO 2010141774 A | 12/2010 |
| WO | WO 2017204889 A1 | 11/2017 |
| WO | WO 2018093504 A1 | 5/2018 |
| WO | WO 2019030522 A2 | 2/2019 |
| WO | WO 2019140235 A1 | 7/2019 |

* cited by examiner

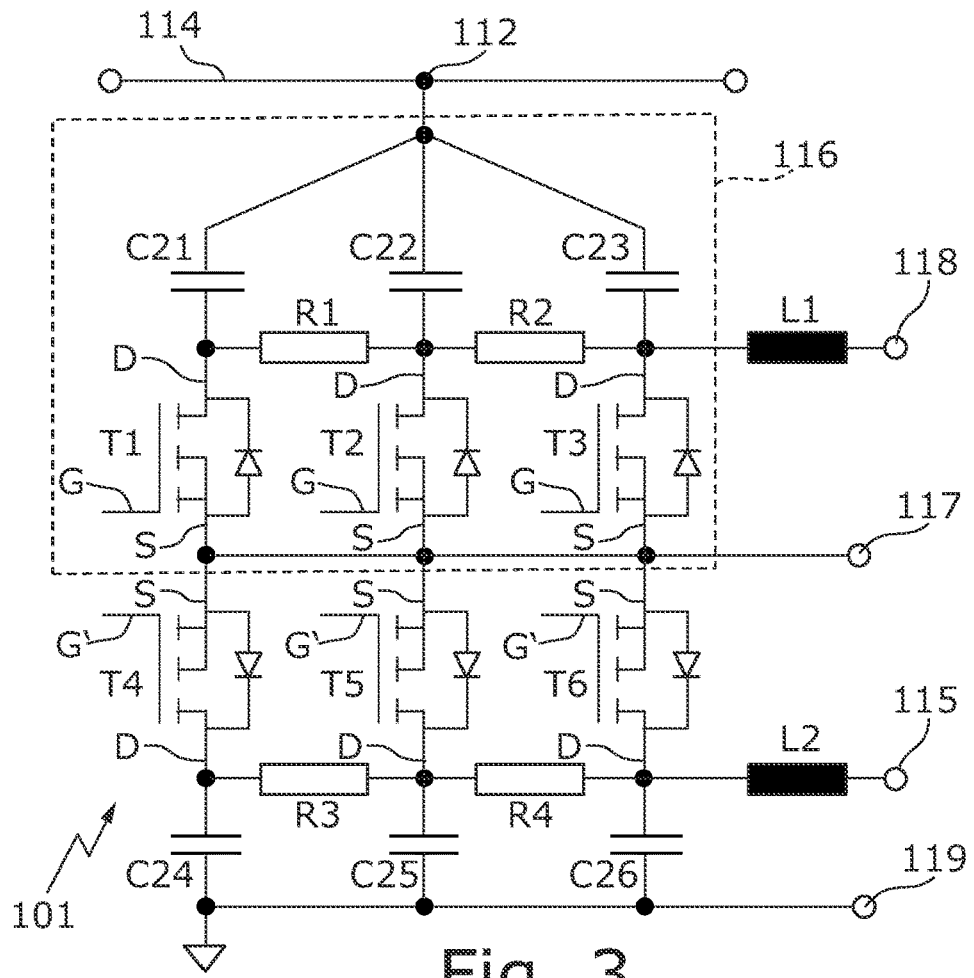
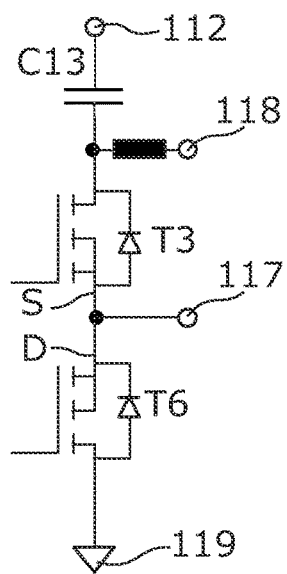 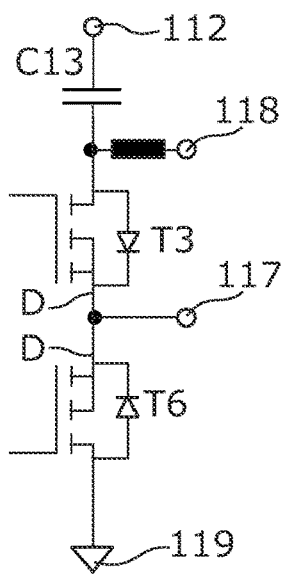 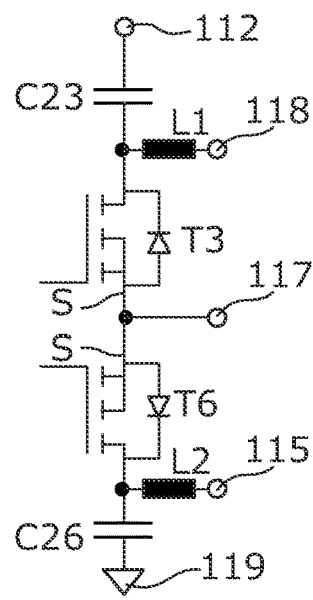
Fig. 3
Fig. 4a    Fig. 4b    Fig. 4c

SWITCHABLE-REACTOR UNIT, VARIABLE REACTOR, HIGH-FREQUENCY GENERATOR, AND IMPEDANCE ADJUSTMENT ASSEMBLY HAVING A SWITCHABLE-REACTOR UNIT

CROSS REFERENCE TO RELATED APPLICATIONS

This application is a continuation of International Application No. PCT/EP2021/066633 (WO 2021/255250 A1), filed on Jun. 18, 2021, and claims benefit to German Patent Application No. DE 20 2020 103 539.8, filed on Jun. 19, 2020. The aforementioned applications are hereby incorporated by reference herein.

BACKGROUND

The invention relates to a switchable reactance unit comprising a radio-frequency terminal (RF terminal) for connecting the switchable reactance unit to a transmission line for transmitting a signal at a frequency in the range of 1-200 MHz, and a switching arrangement comprising a plurality of switching elements used in parallel, each of said switching elements having a control terminal. A switchable reactance unit is taken to mean an electrical circuit unit that can be used to connect or disconnect reactances such as e.g. capacitances and/or inductances. They usually have said reactances and switching elements, e.g. transistors, PIN diodes, or similar electronic components.

An aspect of the invention also includes a variable reactance having at least one, in particular a plurality of, such switchable reactance unit(s).

An aspect of the invention also includes an impedance-matching arrangement having one, in particular a plurality of, such switchable reactance unit(s) and/or one, in particular a plurality of, such variable reactance(s).

An aspect of the invention also includes a radio-frequency power generator (RF power generator) having at least one, in particular a plurality of, such switchable reactance unit(s) and/or at least one, in particular a plurality of, such variable reactance(s).

An aspect of the invention also includes a plasma supply system having
 such an impedance-matching arrangement and/or an RF power generator, each having
 at least one, in particular a plurality of, such switchable reactance unit(s) and/or at least one, in particular a plurality of, such variable reactance(s). Such an impedance-matching arrangement can furthermore have a controller and in particular a measuring device connected to said controller.

An aspect of the invention also includes a method for operating an above-described impedance-matching arrangement and/or an above-described RF power generator in particular in an above-described plasma supply system.

Impedance-matching arrangements are often used in RF-excited plasma processes.

RF-excited plasma processes are used for example for coating (sputtering) and/or etching substrates in the manufacture of architectural glass, semiconductors, photovoltaic elements, flat screens, displays, etc. The impedances in such processes often change very rapidly, for which reason the impedance matching should often be matched very rapidly (within a few milliseconds or less). The powers of such processes are a few 100 W (for example 300 W or greater), but not infrequently even a few kilowatts or a few 10 KW. In the case of such powers, the voltage within the impedance-matching arrangements is often several 100 V (for example 300 V or more), and not infrequently 1000 V or more. The currents in such circuits may be a few amperes, often a few 10 A, sometimes even 100 A or more. Realizing impedance-matching arrangements in the case of such voltages and currents has always been a major challenge. The rapid variability of reactances in such impedance-matching circuits is an additional very great challenge.

One such impedance-matching arrangement is disclosed in DE 10 2015 220 847 A1, for example, where it is referred to as an impedance matching network. The reactances 18, 20, 22 disclosed therein are variably adjustable in order to be able to adjust the impedance matching. One possibility for variable adjustment consists in connecting and disconnecting reactances having different values by means of electronically controlled semiconductor switches.

In the case of such impedance-matching arrangements, the requirement concerns a reactance, in particular capacitance, in a switched impedance-matching arrangement being dynamically connected into an RF path. With electronically connectable and disconnectable reactances, impedance matching can be effected very much more rapidly than with conventional impedance-matching arrangements with mechanically variable reactances, such as e.g. variable capacitors. Therefore, the development of such impedance-matching arrangements with one or more switchable reactance unit(s) in the impedance-matching arrangement is highly desirable. However, these impedance-matching arrangements have a serious disadvantage. Since the impedance usually has to be matched during operation, the switching elements in a switchable reactance unit have to be able to switch very high currents on and off. Very expensive switching elements are often used for this purpose. Therefore, the disadvantages of the conventional mechanically variable reactances are often still accepted. In general it known to divide a high current among a plurality of components connected in parallel. However, such connection in parallel is always particularly critical in the case of switching elements because the tolerances of the on resistances and of the switch-on and switch-off dynamic characteristics vary to quite a great extent and it is therefore not possible to ensure that at all times the current is distributed sufficiently uniformly among all the switching elements connected in parallel. Particularly in the case of the high currents mentioned above, that can result in rapid wear and even sudden destruction of the switching elements. That is extremely undesirable.

SUMMARY

In an embodiment, the present disclosure provides a switchable reactance unit that includes an RF terminal configured to connect to a transmission line for transmitting a signal at a frequency in a range of 1-200 MHz, and a switching arrangement comprising a plurality of switching elements used in parallel. Each switching element has a control terminal, and is connected to the RF terminal via at least one individual reactance assigned to the switching element and connected in series with the switching element. The switching elements are controllable or controlled via their control terminals in such a way that they switch simultaneously. In further aspects, the invention provides a variable reactance having at least one such switchable reactance unit and an impedance matching arrangement having at least one such switchable reactance unit.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following:

FIG. 3 shows a switchable reactance unit comprising further switching elements connected in series with the switching elements; and FIGS. 4a; 4b, and 4c show switching element series circuits in three different configurations.

DETAILED DESCRIPTION

Figure 1:
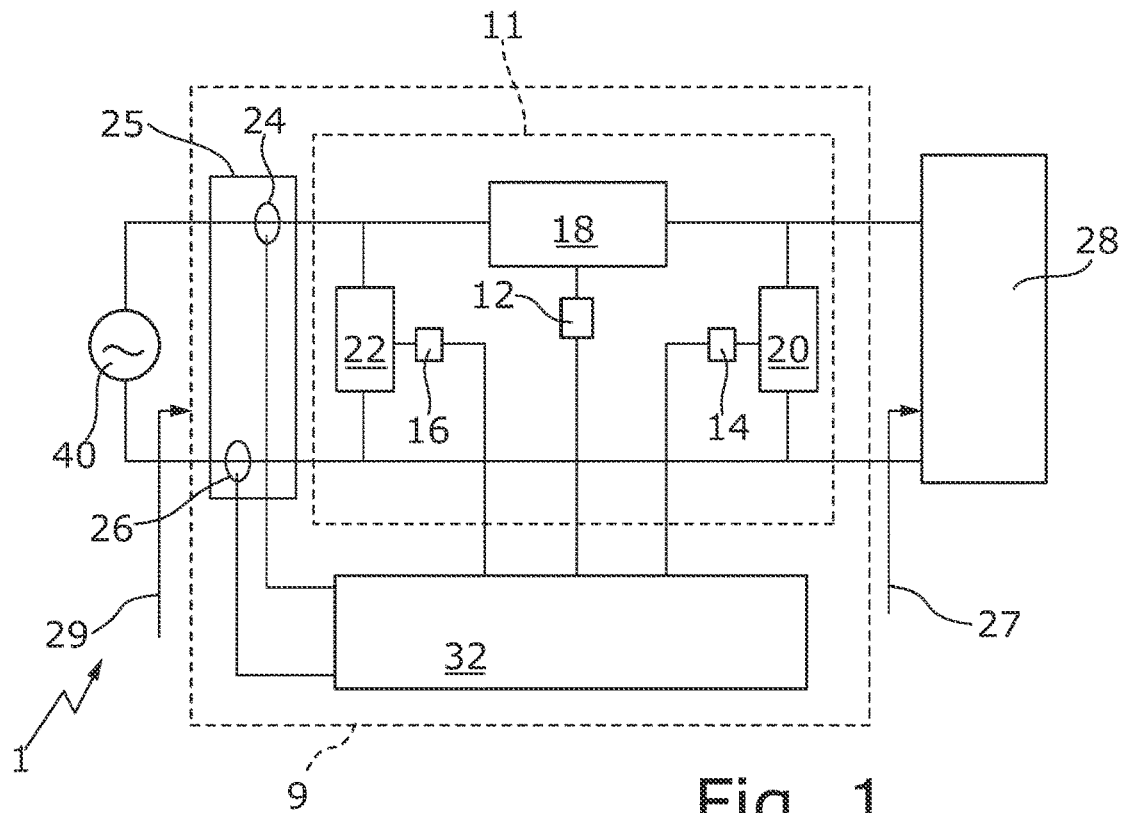
FIG. 1 shows a plasma supply system comprising an impedance-matching arrangement.

An object of the present invention, therefore, is to provide a significantly more expedient switchable reactance unit and in particular also an impedance-matching arrangement equipped therewith and/or an RF power generator equipped therewith having a high degree of reliability and fail-safety.

In an aspect, the present invention provides a switchable reactance unit comprising an RF terminal for connecting the switchable reactance unit to a transmission line for transmitting a signal at a frequency in the range of 1-200 MHz, and a switching arrangement comprising a plurality of switching elements used in parallel, each of said switching elements having a control terminal, wherein each switching element is connected to the RF terminal via at least one individual reactance assigned to the switching element and connected in series with the switching element, the switching elements being controllable or controlled via their control terminals in such a way that they switch simultaneously.

In one configuration, a variable reactance has at least one, in particular a plurality of, switchable reactance unit(s), in particular a plurality of switchable reactance units connected in parallel, the plurality of switchable reactance units being designed in particular to switch different reactances, in particular reactances whose value differs in each case by the factor two.

In one configuration, an impedance-matching arrangement has at least one, in particular a plurality of, switchable reactance unit(s) according to the invention and/or at least one, in particular a plurality of, variable reactance(s).

In one configuration, an RF power generator has
a) a power converter suitable for converting a radio-frequency power in the frequency range of 1 MHz to 200 MHz from a power having a frequency of less than 1 kHz and
b) at least one, in particular a plurality of, switchable reactance unit(s) according to the invention and/or one, in particular a plurality of, variable reactance(s).

"Switched simultaneously is taken to mean that the switching elements are switched simultaneously in so far as is technically customary and possible. Switching elements that are not quite identical often have different switching delays. The actual switching times are therefore permitted to deviate slightly. Switching differences of typically less than or equal to 100 ns, in particular less than or equal to 10 ns, are deemed to be simultaneous within the meaning of the present invention. By virtue of an overall reactance that is to be switched by the switchable reactance unit being divided into a plurality of individual reactances, each of which is assigned to a switching element, each switching element is in principle loaded only with the current of said individual reactance assigned thereto. This prevents individual switching elements from being overloaded as a result of the different switching delays of the switching elements during the switch-on and switch-off processes, as might be the case for an undivided overall reactance.

Since the current through the switchable reactance unit is divided in a defined manner by the individual reactances, this arrangement likewise prevents the overloading of individual switching elements on account of different on resistances, as would be possible in the case of a direct parallel connection of switching elements at only one reactance. Influences on the current as a result of the construction of the circuit, such as leads or variations of the component parameters, are minimized.

Radio frequency (RF) here is taken to mean a frequency of 1 MHz or more. In particular, it is taken to mean a frequency in the range of 1 to 200 MHz.

In one preferred configuration, the switchable reactance unit, the variable reactance, the impedance-matching arrangement and/or the RF power generator are/is designed for a frequency in the range of 9 MHz to 30 MHz, in particular 13.56 MHz or 27.12 MHz in each case +/−10%.

A reactance can be an inductance or capacitance or a combination of both.

The switchable reactance unit can have more than two, in particular more than three, in particular more than four, switching elements used in parallel, with respect to the assigned individual reactances. Destruction as a result of asymmetric current division can thus be prevented.

At least one individual reactance can be embodied as a capacitance, in particular a plurality of individual reactances can be embodied as capacitances, particularly preferably all the individual reactances can be embodied as capacitances. It is thus possible, instead of switching a large overall capacitance, to divide the latter among a plurality of small individual capacitances, each of which is connected in series with an assigned switching element. The total of the individual capacitances yields the original capacitance to be switched.

The capacitances can have the same capacitance value. This ensures that substantially the same current flows through all the switching elements.

Each of the switching elements used in parallel can have a source terminal and the latter can be connected to a common terminal point. This makes it possible to ensure that the switching elements used in parallel are all at the same potential.

In particular, the common terminal point can be connected to ground. Alternatively, the common terminal point can be connected to a radio-frequency potential.

At least one individual reactance can be embodied as inductance, in particular a plurality of individual reactances can be embodied as inductances, particularly preferably all the individual reactances can be embodied as inductances.

Instead of dividing an overall capacitance into smaller individual capacitances, a matched overall capacitance to which a plurality of inductances are connected in star-type fashion can be used. Each of the inductances can then be connected in series with a switching element. In accordance with the above definition, these inductances are then the individual reactances. This series circuit formed by the matched overall capacitance and the inductances connected in parallel can then be adjusted such that at the operating frequency it has the same impedance as the overall capacitance originally desired.

The switching elements can be embodied as transistors, in particular as field effect transistors, preferably as MOSFETs, LDMOS, or can comprise PIN diodes. In particular, the switching elements can have a body diode. With these components, in particular MOSFETs with a body diode, the switching elements can be realized particularly cost-effectively. The price advantage may be so great that it more than compensates for the costs for the multiple use of switching elements and reactances.

The switching elements can each have a gate terminal, via which the switching elements can be switched on. The gate terminals can be directly or indirectly connected to one another in order to switch on the switching elements simultaneously.

Each of the switching elements can have a drain terminal and the individual reactances can each be connected to the drains.

A drain terminal of the switching elements can be connected to a drain bias terminal via a drain bias inductance. A drain bias voltage can be connected to said drain bias terminal. Said drain bias voltage can be higher than the peak voltage of the sign-inverted RF half-cycle which is present across the switching element in the open state, in order e.g. to prevent activation of the body diode. In this case, the drain terminals of a plurality of, in particular all, switching elements can be connected to one another via a respective drain connection resistance. The drain bias voltage can be connectable and disconnectable via a further switching element.

In order not to have to use a bias supply with RF inductor for each switching element used in parallel, the drain terminals can be connected via resistances. It is thus sufficient to apply a drain bias voltage only to one of the drains via an inductance, in particular via an RF inductor, and to distribute it to the other switching elements via the drain connection resistances.

The resistance value of a, in particular each, drain connection resistance can be greater than the impedance of one of the switching elements in the closed state. In this way, it is possible to limit an RF shunt current through the resistances during a switching process and to prevent destruction of the drain connection resistances.

The resistance value of a, in particular each, drain connection resistance can be dimensioned in each case such that $\tau = R*C$ does not exceed a predefined value, in order that in the event of switching off the switching elements and applying the drain bias voltage to the drain bias terminal, the individual capacitances can be charged rapidly enough to the drain bias voltage.

Inductances could also be used instead of the drain connection resistances.

The switching arrangement can have a plurality of, in particular two, in particular three, in particular four, switching elements used in parallel, with in each case preferably identical assigned individual reactances. In this regard, asymmetric current division cannot destroy individual switching elements.

Provision can be made of a plurality of switching arrangements having in each case a plurality, in particular in each case a different number, of switching elements used in parallel and/or a different size of the assigned individual reactances. Consequently, with the impedance-matching arrangement it is possible to react particularly flexibly to different required impedance matchings.

The plurality of switchable reactance units can be designed to switch reactances which differ in each case by the factor two. In this regard, a $2^n$ switchable reactance unit arrangement can be constructed very economically.

The switchable reactance unit can have a further switching element in series with each switching element. As a result, higher voltages can be switched and the switchable reactance unit can be operated even more reliably.

Each of the further switching elements can have a control terminal, and the switching elements and the further switching elements can be controllable or controlled via their control terminals in such a way that they switch simultaneously. In this regard, higher voltages can be switched and the switchable reactance unit can be operated even more reliably.

Each switching element series circuit having in each case one switching element and one further switching element can be constructed from two structurally identical switching elements.

In each case one switching element and one further switching element can be connected at their source terminals.

In each case one switching element and one further switching element can be connected at their drain terminals.

In each case one switching element and one further switching element can be connected to one another in each case at source terminal and drain terminal.

The scope of the invention additionally includes a plasma supply system comprising an RF power generator, a load in the form of a plasma process operated at radio frequency for the purpose of coating or etching a substrate, and an impedance-matching arrangement according to the invention.

The scope of the invention additionally includes a plasma supply system comprising an above-described RF power generator according to the invention, and a load in the form of a plasma process operated at radio frequency for the purpose of coating or etching a substrate. Such a plasma supply system can be operated with and without an additional impedance-matching arrangement. If it is operated with an additional impedance-matching arrangement, then this can be an impedance-matching arrangement with and without variable reactance(s) according to the invention and with or without switchable reactance unit(s) according to the invention.

The invention also encompasses a method for operating an above-described impedance-matching arrangement and/or an above-described RF power generator in particular in an above-described plasma supply system, comprising one or more of the following method steps:

a) switching on the switching element or the switching elements, in particular by means of a sufficiently large positive voltage between the gate terminal and a source terminal or gate terminals and source terminals, b) switching off the switching element or the switching elements, in particular by means of a sufficiently small or negative voltage between the gate terminal and a source terminal or gate terminals and source terminals.

c) connecting a high voltage to the drain terminal of the switching element or the drain terminals of the switching elements, the high voltage having an absolute value greater than that of the RF voltage having the greatest absolute value between drain terminal and source terminal, d) disconnecting the high voltage from the drain terminal of the switching element or from the drain terminals of the switching elements.

The abovementioned method steps b) and c) can preferably be carried out simultaneously.

The abovementioned method steps a) and d) can preferably be carried out simultaneously.

Further advantages of the invention are evident from the description and the drawing. Likewise, the features mentioned above and those that will be explained even further can according to the invention be used in each case individually by themselves or as a plurality in any desired combinations. The embodiments shown and described should not be understood as an exhaustive enumeration, but rather are of exemplary character for outlining the invention.

FIG. 1 shows a plasma supply system 1 comprising an RF power generator 40 connected to a load 28, in particular a plasma load, via an impedance-matching arrangement 11. In this case, the RF power generator 40 can have a power converter suitable for converting a radio-frequency power in the frequency range of 1 MHz to 200 MHz from a power having a frequency of less than 1 kHz. The impedance-matching arrangement 11 is part of an impedance matching device 9. In the exemplary embodiment shown, the impedance-matching arrangement 11 comprises variable reactances 18, 20, 22, which are controlled via a respective control circuit 12, 14, 16 in order to vary their reactance value. The control circuits 12, 14, 16 are controlled by a controller 32. Via a measuring device 25, which can have measuring elements 24, 26, for example for detecting current and voltage, forward power and reflected power and/or absolute value of impedance and phase angle, is connected to the controller 32. On the basis of the variables determined by the measuring device 25, by way of example, a power reflected at the load 28 or a reflection factor can be determined. A reflected power occurs if there is a mismatch, that is to say if the impedance of the load 28 is not matched to the output impedance of the power generator 40. Alternatively or additionally, a corresponding measuring device can also be arranged at the input or within the impedance matching device 9. The impedance matching arrangement 9 is suitable for converting the load impedance 27 at the input of the load 28 into a transformed load impedance 29 at the input of the impedance-matching arrangement 11, i.e. on the generator side.

The impedance-matching arrangement 11 and/or the impedance matching device 9 can also be integrated into an RF power generator 40 (not shown).

An RF power generator 40 can also have one or more variable reactance(s) 18, 20, 22.

Figure 2:
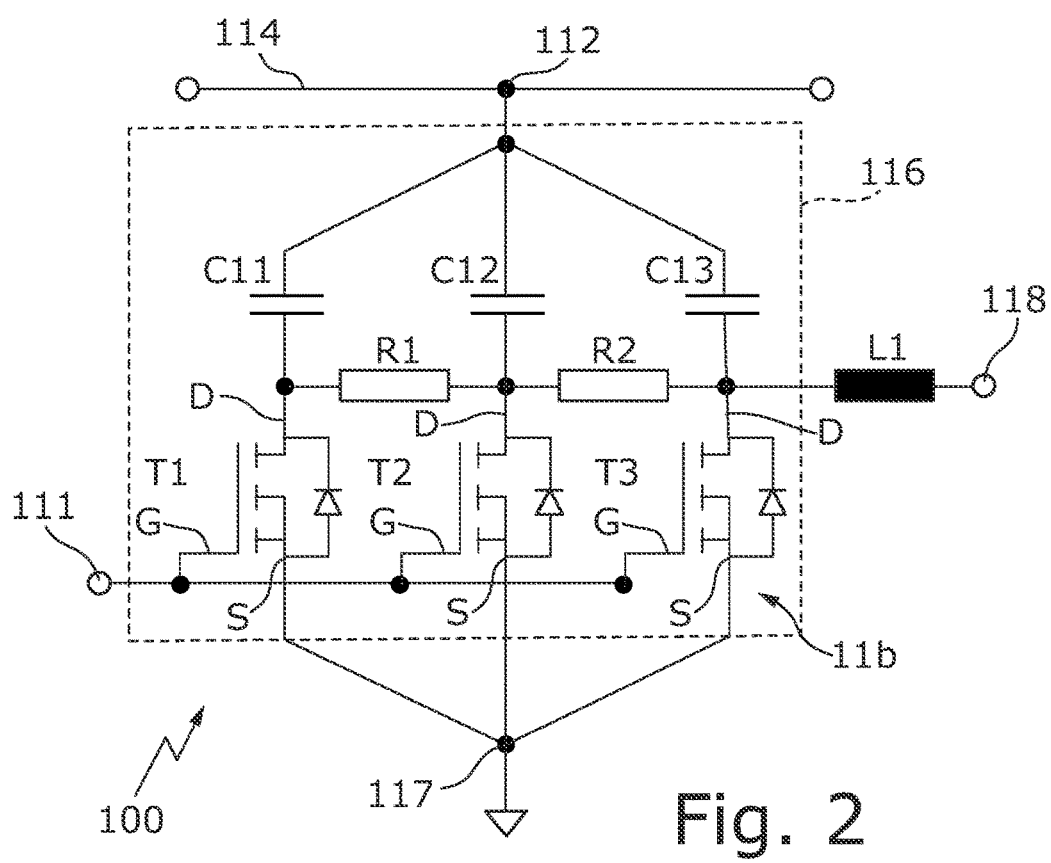
FIG. 2 shows a switchable reactance unit.

An RF power generator 40 can also have one or more switchable reactance unit(s) 100 (FIG. 2).

Control circuits 12, 14, 16 can be designed and in particular also operated as described in the utility model specification DE 20 2020 102 084 U1 having the application number DE 20 2020 102 084.6. Reference is made to the disclosure thereof and that disclosure is incorporated in the subject matter of the present disclosure. In this case, the impedance matching circuit described therein corresponds to the impedance-matching arrangement 11 described here. The RF terminal RFin described therein corresponds to the RF terminal 112 described here. The GND/RFout described therein may correspond to the common terminal 112 (FIG. 2) or 119 (FIG. 3) described here.

FIG. 2 shows a switchable reactance unit 100. The latter has an RF terminal 112 for connecting the switchable reactance unit 100 to a transmission line 114 for transmitting a signal in the frequency range of 1 to 200 MHz. Furthermore, the switchable reactance unit 100 comprises a switching arrangement 116 comprising a plurality of switching elements T1, T2, T3, used in parallel, each of which has a control terminal G. Furthermore, the switching elements T1, T2, T3 have a drain terminal D and a source terminal S. The source terminals S of the switching elements T1, T2, T3 are connected to a common terminal 117, which is connected to ground in the exemplary embodiment shown. Each switching element T1, T2, T3 is connected to the RF terminal 112 via an individual reactance C11, C12, C13 assigned to said switching element and connected in series. In the exemplary embodiment shown, the individual reactances C11, C12, C13 are embodied as capacitances.

A plurality of switchable reactance units 100, in particular connected in parallel, can be arranged in each of the variable reactances 18, 20, 22 mentioned above.

The plurality of switchable reactance units 100, in particular connected in parallel, can each be designed to switch reactances which differ in each case by the factor 2. In this regard, a $2^n$ switchable reactance unit arrangement can be constructed very economically. By way of example, one switchable reactance unit can switch a capacitance of 1 pF, the next switchable reactance unit can switch a capacitance of 2 pF, the next switchable reactance unit can switch a capacitance of 4 pF, the next switchable reactance unit can switch a capacitance of 8 pF, and so on. If for example 8 of such switchable reactance units are connected in parallel, up to 255 pF can be connected and disconnected in 1 pF steps.

In this case, a switchable reactance unit which switches only a low capacitance value, e.g. capacitance values of less than or equal to 8 pF, can have a small number of switching elements (T1, T2, T3) connected in parallel, e.g. two or else just one. In this case, a switchable reactance unit which switches higher capacitance values compared therewith, e.g. capacitance values of greater than 8 pF, can have more switching elements (T1, T2, T3) connected in parallel, e.g. three or more.

In this exemplary embodiment, the switching elements T1, T2, T3 are configured as a MOSFET having a body diode. The body diode is integrated in most currently available MOSFETs owing to the design and is connected to the drain terminal D by its cathode and to the source terminal S by its anode.

The switching elements T1, T2, T3 can be embodied substantially identically. Their control terminals G can be connected to one another and can be jointly controllable via the terminal 111. This makes it possible to ensure that the switching elements T1, T2, T3 switch substantially simultaneously.

The individual reactances C11, C12, C13 can preferably be embodied identically, such that radio-frequency currents through the switching elements T1, T2, T3 are likewise substantially identical. The variation of the currents through the switching elements T1 to T3 is thus dependent on the tolerance of the individual reactances C11 to C13.

The drain terminals D of the switching elements T1, T2, T3 can be connected to one another via drain connection resistances R1, R2. In addition, they can be connected to a drain bias terminal 118 via a drain bias inductance L1. In the off-state case, the drain connection resistances R1, R2 distribute the drain bias voltage to the individual switching elements T1 to T3. The off-state case is the case when the switching elements T1, T2, T3 are in the open, i.e. nonconducting, state. In the exemplary embodiment illustrated, the drain connection resistances R1, R2 are connected in series and connect the drain terminals of the switching elements T1, T2, T3 in the form of a chain. That may be advantageous for the realization on a printed circuit board since the drain connection resistances R1, R2 can then be arranged and connected clearly and in a space-saving manner. Alternatively, the drain connection resistances R1, R2 can be connected to the further drain terminals D in star-type fashion from the drain terminal D with the direct connection to the drain bias inductance L1. In the case of a relatively large number of switching elements T1, T2, T3 connected in parallel, that can have a positive effect on the charging time τ=R*C. In the case of more than two drain connection resistances R1, R2, the connection can also be implemented from a combination of series connection and star connection in order to utilize both advantages.

The drain bias voltage can be connectable and disconnectable via a further switching element (not shown). A corresponding switching element is disclosed by T3 in FIG. 2 in DE 20 2020 102 084 U1. The drain bias voltage is described therein as a high voltage HV. Said high voltage can be a DC voltage. Said high voltage should have an absolute value greater than that of the maximally negative RF voltage that occurs at one of the drain terminals D. Said high voltage can be connected via a further switching element, that is to say that during operation the further switching element is switched on, i.e. switched to the conducting state, if the control circuit 12 switches off the switching elements T1, T2, T3, i.e. switches them to the nonconducting state.

A drain bias resistance (not shown) can be connected in series with the drain bias inductance L1. The drain bias resistance can be designed to damp oscillations which to damp by the combination of capacitances used, parasitic capacitances, inductances used and parasitic inductances. Two of such drain bias resistances are shown by R1 and R2 in FIG. 2 in the disclosure of DE 20 2020 102 084 U1, for example.

If the switching elements are switched on again, i.e. switched to the conducting state, the drain bias voltage (high voltage) should be disconnected from the switching elements T1, T2, T3, that is to say that the further switching element should be switched off, i.e. switched to the nonconducting state, in order to prevent a DC current through the switching elements.

The arrangement in FIG. 2 can be realized on a printed circuit board (PCB).

FIG. 3 shows a switchable reactance unit 101 comprising further switching elements T4, T5, T6 respectively connected in series with the switching elements T1, T2, T3. The further switching elements T4, T5, T6 are controlled at their gate terminals G'. The further switching elements T4, T5, T6 and the switching elements T1, T2, T3 connected in series are controlled such that all the switching elements T1-T6 are switched on and off simultaneously. The further switching elements T4, T5, T6 connected in series with the switching elements T1, T2, T3 bring about a lower voltage loading of all the switching elements T1-T6. More expedient switching elements having lower dielectric strength values can thus be used. Here, too, the drain bias voltage is transmitted through the drain connection resistances R1, R2 and the additional drain connection resistances R3, R4, but without permitting an appreciable RF shunt current during the switch-on and switch-off processes of the switching elements. In this arrangement, in each case one switching element T1, T2, T3 and one further switching element T4, T5, T6 are connected at their source terminal S. All the source terminals S can be connected at the common terminal 117. The latter can also function as reference potential for the control circuits 12, 14, 16, as are shown in FIG. 2 in DE 20 2020 102 084 U1, for example. The common terminal 117 can be connected to ground (not shown) by way of a series circuit formed by an inductance and a resistance, in order to suppress drifting away and/or oscillations. Analogously to the described drain connection resistances R1, R2 in the case of the switching elements T1, T2, T3, drain connection resistances R3, R4 can likewise be connected to the drain terminals D of the further switching elements T4, T5, T6. An additional drain bias inductance L2 can connect an additional drain bias terminal 115 to a drain terminal D of the further switching elements T4, T5, T6. The original individual reactances C11, C12, C13 from FIG. 2 can now be divided into in each case two, in particular structurally identical, individual reactances C21 and C24, C22 and C25, and also C23 and C26. That means that in order to be able to switch the same reactance as in FIG. 2, the value of C11 is equal to the value of C21 with C24, the value of C12 is equal to the value of C22 with C25, and the value of C13 is equal to the value of C23 with C26, in each case connected in series. The additional individual reactances C24, C25, C26 can be interconnected at a common radio-frequency terminal 119, which can be connected to ground or some other radio-frequency potential in an impedance-matching arrangement 11. A drain bias resistance (not shown) can be connected in series with the additional drain bias inductance L2.

The arrangement in FIG. 3 can be realized on a printed circuit board (PCB).

FIGS. 4a-c show switching element series circuits in three different configurations, all of which can be realized on a printed circuit board (PCB). Switching element series circuits are part of a switchable reactance unit 100, 101. FIG. 4c shows for example the right-hand partial region of the switchable reactance unit 101 from FIG. 3. The switching elements T3 and T6 are connected herein at their source terminals.

FIG. 4b shows a similar circuit arrangement; the switching elements T3 and T6 are connected in series herein at their drain terminals D. The disadvantage of this series connection is that the upper switching element T3 has to be switched on and off against the full RF voltage.

FIG. 4a shows a similar circuit arrangement. The switching elements T3 and T6 herein are connected by way of source terminal S of T3 and drain terminal D of T6. Since each drain-gate voltage has to be connected individually here, this series connection is somewhat more complex. The series connection of the switching elements T3, T6 bring about a lower voltage loading of all the switching elements T3, T6. More expedient switching elements having lower dielectric strength values can thus be used.

The circuit arrangement in accordance with FIG. 4c is the preferred circuit arrangement if a series connection is used. It is also presented as preferred circuit arrangement in FIG. 2 in DE 20 2020 102 084 U1.

For the switching elements, a MOSFET is preferably used, with a maximum drain-source voltage (VDS) of approximately 1.5 to 2.5 kV, an on resistance RDSon of approximately 0.5 ohm, a maximum drain current of approximately 30 A. That may be e.g. a MOSFET from Infineon having the component designation IPA95R450P7. This MOSFET is commercially available in a very expedient manner because it is designed for significantly more fields of use than for impedance-matching arrangements for plasma processes and is accordingly manufactured in large numbers. The drain connection resistances are advantageously rated at approximately 10 ohms.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A switchable reactance unit comprising:
a radio frequency (RF) terminal configured to connect to a transmission line for transmitting a signal at a frequency in a range of 1-200 MHz, and
a switching arrangement comprising a plurality of switching elements used in parallel, each switching element having a control terminal, and being connected to the RF terminal via at least one individual reactance assigned to the switching element and connected in series with the switching element, wherein the control terminals of the plurality of switching elements being are connected to one another and thereby are controllable in such a way that the plurality of switching elements are switched on or off simultaneously with switching differences less than or equal to 100 ns.

2. The switchable reactance unit as claimed in claim 1, wherein at least one individual reactance is embodied as a capacitance.

3. The switchable reactance unit as claimed in claim 2, wherein at least two individual reactances are embodied as capacitances having the same capacitance value.

4. The switchable reactance unit as claimed in claim 1, wherein each of the switching elements used in parallel has a source terminal connected to a common terminal point.

5. The switchable reactance unit as claimed in claim 1, wherein at least one individual reactance is embodied as an inductance.

6. The switchable reactance unit as claimed in claim 1, wherein the switching elements are embodied as transistors or comprise PIN diodes.

7. The switchable reactance unit as claimed in claim 1, wherein each of the switching elements has a drain terminal and the individual reactances are each connected to the drain terminals.

8. The switchable reactance unit as claimed in claim 7, wherein the drain terminals of the switching elements are connected to a drain bias terminal via a drain bias inductance.

9. The switchable reactance unit as claimed in claim 7, wherein the drain terminals of the plurality of switching elements are connected to one another via a respective drain connection resistance.

10. The switchable reactance unit as claimed in claim 9, wherein a resistance value of each of the drain connection resistances is greater than an impedance of one of the switching elements in a closed state.

11. The switchable reactance unit as claimed in claim 9, wherein a resistance value of the drain connection resistance is dimensioned in each case such that $\tau=R*C$ does not exceed a predefined value.

12. A method for operating an impedance-matching arrangement as claimed in claim 7, comprising one or more of the following method steps:
a) switching on at least one of the plurality of switching elements;
b) switching off at least one of the plurality of switching elements;
c) connecting a high voltage to the drain terminal of the one of the plurality of switching elements, the high voltage having an absolute value greater than that of the RF voltage having the greatest absolute value; and
d) disconnecting the high voltage from the drain terminal of the at least one of the plurality of switching elements.

13. The method as claimed in claim 12, wherein the aforementioned method steps b) and c) are carried out simultaneously.

14. The method as claimed in claim 12, wherein the aforementioned method steps a) and d) are carried out simultaneously.

15. The switchable reactance unit as claimed in claim 1, further comprising a further switching arrangement having a plurality of further switching elements used in parallel.

16. The switchable reactance unit as claimed in claim 1, further comprising a plurality of further switching elements, each disposed in series with a respective one of the plurality of switching elements.

17. The switchable reactance unit as claimed in claim 16, wherein each of the further switching elements has a control terminal, the switching elements and the further switching elements being controllable or controlled via a respective one of the control terminals in such a way that they switch simultaneously.

18. The switchable reactance unit as claimed in claim 1, further comprising a controller that is capable of impedance matching.

19. A variable reactance comprising a switchable reactance unit that comprises:
an RF terminal configured to connect to a transmission line for transmitting a signal at a frequency in a range of 1-200 MHz, and
a switching arrangement comprising a plurality of switching elements used in parallel, each switching element having a control terminal, and being connected to the RF terminal via at least one individual reactance assigned to the switching element and connected in series with the switching element, wherein the control terminals of the plurality of switching elements are connected to one another and thereby are controllable in such a way that the plurality of switching elements are switched on or off simultaneously with switching differences less than or equal to 100 ns.

20. The variable reactance as claimed in claim 19, wherein the variable reactance has a plurality of switchable reactance units connected in parallel.

21. The variable reactance as claimed in claim 20, wherein the switchable reactance units are configured to switch different reactances.

* * * * *